(12) United States Patent
Rubio et al.

(10) Patent No.: US 8,171,535 B2
(45) Date of Patent: May 1, 2012

(54) DYNAMIC WEB SERVICE POLICY BROADCASTING/ENFORCEMENT FOR APPLICATIONS

(75) Inventors: Ramon Rubio, Downey, CA (US); Wei-Jhy Chern, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 11/613,128

(22) Filed: Dec. 19, 2006

(65) Prior Publication Data

US 2008/0148344 A1 Jun. 19, 2008

(51) Int. Cl.
*G06F 21/00* (2006.01)
(52) U.S. Cl. .............................................. 726/10; 726/1
(58) Field of Classification Search ............ 714/38, 714/49, 48, 35, 37; 709/203, 217, 223, 237, 709/225, 229, 227; 726/22, 14, 13, 11, 34, 726/25, 26, 27; 380/42, 55, 58, 46
See application file for complete search history.

(56) References Cited

U.S. PATENT DOCUMENTS

| | | | |
|---|---|---|---|
| 6,301,661 B1 | 10/2001 | Shambroom | |
| 2002/0016777 A1* | 2/2002 | Seamons et al. | 705/76 |
| 2004/0088587 A1 | 5/2004 | Ramaswamy et al. | |
| 2004/0167984 A1* | 8/2004 | Herrmann | 709/229 |
| 2005/0177724 A1 | 8/2005 | Ali et al. | |
| 2005/0251853 A1 | 11/2005 | Bhargavan et al. | |
| 2005/0256947 A1 | 11/2005 | Devarakonda et al. | |
| 2006/0015625 A1 | 1/2006 | Ballinger et al. | |
| 2006/0031683 A1 | 2/2006 | Marion et al. | |
| 2006/0041669 A1 | 2/2006 | Bemmel et al. | |
| 2006/0080352 A1* | 4/2006 | Boubez et al. | 707/102 |
| 2008/0109912 A1* | 5/2008 | Rivera | 726/30 |

* cited by examiner

*Primary Examiner* — Vivek Srivastava
*Assistant Examiner* — Nega Woldemariam
(74) *Attorney, Agent, or Firm* — Canon U.S.A., Inc., IP Division

(57) ABSTRACT

A system enables a client coupled to a server via a network to exchange security policy information across the network. The client is configured to determine security policy associated with the server based on a notification returned from the server. The notification having policy information embedded therein is issued by the server in response to the server's decision to deny client's access request. Based on the policy information embedded in the notification, the client is configured to generate a new access request by either acquiring information from a client user or selecting a different credential from a library of credentials.

19 Claims, 5 Drawing Sheets

DYNAMIC WEB SERVICE POLICY BROADCASTING/ENFORCEMENT FOR APPLICATIONS

BACKGROUND OF THE INVENTION

1. Field of the Invention

The present invention generally relates to network systems and more particularly relates to a method and system for determining and enforcing policy attributes of Web servers and Web services.

2. Description of the Related Art

When Web services are provided over a network, security policies generally need to be employed to prevent unauthorized users from accessing Web servers and Web services. One currently available Web service protocol (i.e., Web Services Enhancements) supports static configuration of security policies for Web services. One drawback associated with the static configuration of security policies for Web services is that a client seeking to access a service provided by a service provider may be required to manually reconfigure its credential each time security policy rule defined by the service provider changes.

SUMMARY OF THE INVENTION

Exemplary embodiments of the present invention are directed a system for enabling a client coupled to a server via a network to exchange security policy information across the network. The client is configured to determine security policy associated with the server based on a notification returned from the server. The notification having policy information embedded therein may be issued by the server in response to the server's decision to deny client's access request. Based on the policy information embedded in the notification, the client is configured to generate a new access request by either acquiring information from a client user or selecting a different credential from a library of credentials.

According to an aspect of the present invention, at least one embodiment is directed to a method of discovering and complying with security policy of a server connected to a network. The method includes transmitting a first request to access a service provided a server and receiving a notification from the server, which is generated in response to the first request being denied access. The method further includes examining the notification to determine policy associated with the server, generating a second request in accordance with the policy associated with the server, and transmitting the second request to access the service provided the server.

According to another aspect of the present invention, at least one embodiment is directed to a system enabling a client and a server to exchange security policy information over a network. The system includes a server and a client coupled to the server via a network. The server is configured to perform one or more Web services and to generate a notification having policy information embedded therein if an incoming request is denied access. The client is configured to generate and send an access request to the server, and to determine security policy associated with the server based on the notification returned by the server in response to the access request being denied access to the service.

According to another aspect of the present invention, at least one embodiment is directed to an apparatus (e.g., client device) that is capable of dynamically discovering and enforcing security policy of a server (e.g., service provider) over a network. The apparatus includes a communication interface to establish communication with a server connected to a network, and an application configured to receive a user input and to generate an access request to access a service provided by the server in response to the user input requesting access to the service. In the event the access request is denied by the server, it will transmit a notification that has policy information associated with the server embedded therein. The apparatus employs a policy discovery unit to determine security policy associated with the server based on a notification returned from the server in response to the access request being denied access. Then, based on the determined security policy associated with server, the apparatus employs an authentication processing unit to generate another request to authenticate with the server and to access the service provided thereby.

According to another aspect of the present invention, at least one embodiment is directed to a server capable of communicating and enforcing security policies associated with login applications and services executed by the server. The server includes a policy manager configured to receive an incoming request from a client and determine if the request satisfies policy of a service to which the request is seeking access, a notification generator configured to generate a notification having policy information included therein if the request is denied access, and a communication interface configured to transmit the notification to the client seeking access.

Further features and aspect of the present invention will become apparent from the following detailed description of exemplary embodiments with reference to the attached drawings.

DESCRIPTION OF THE EMBODIMENTS

Exemplary embodiments of the present invention are described below with reference to the drawings.

Figure 1:
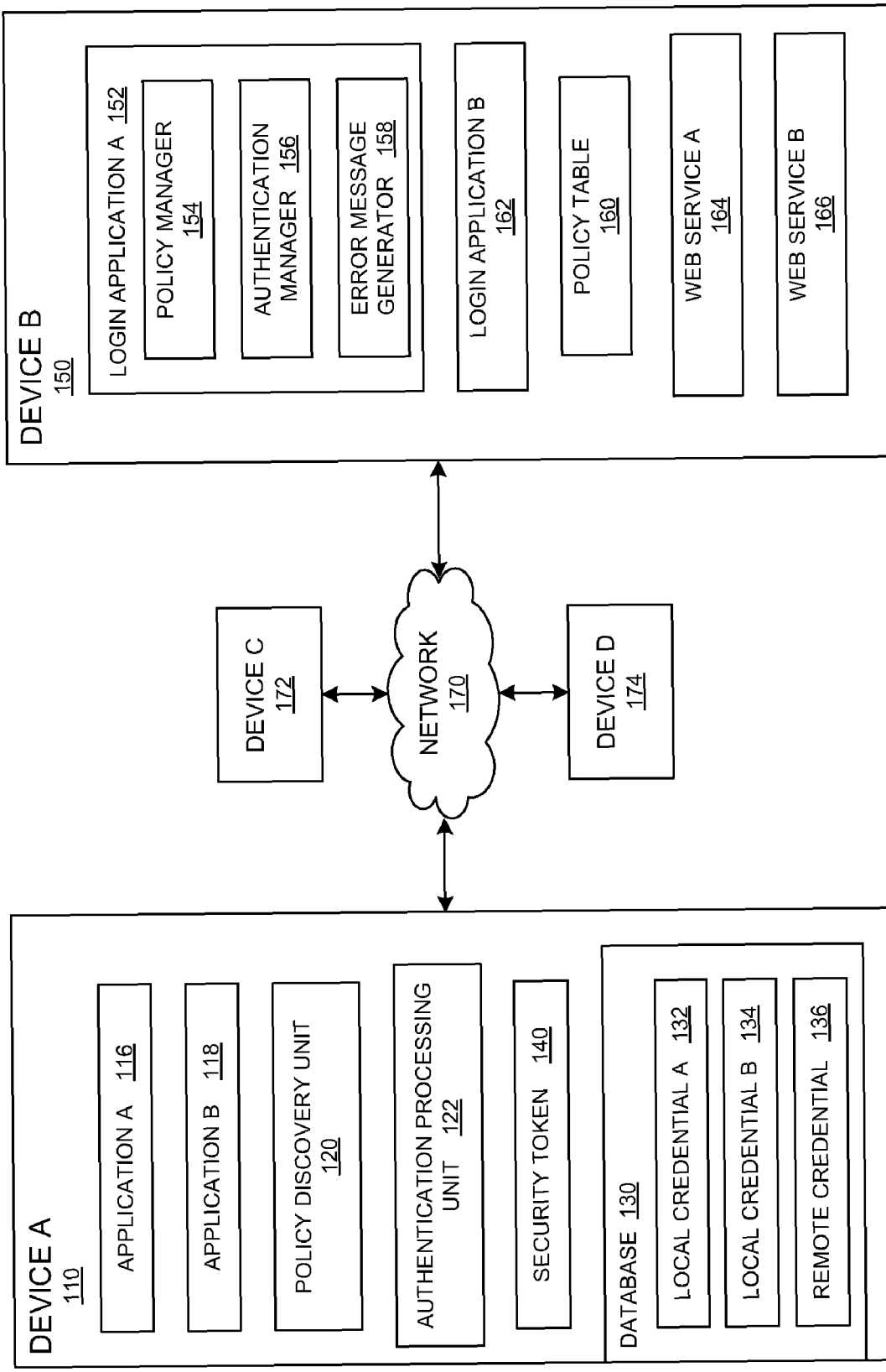
FIG. 1 is a block diagram of a network system according to an embodiment of the present invention.

First, a network system will be described which implements operations for discovering and enforcing security policy attributes of servers and services performed by the servers according to an embodiment of the present invention. FIG. 1 is a block diagram showing a simplified representation of a network system according to an embodiment of the present invention.

The system generally includes one or more devices operatively coupled via a network. The system enables two devices to exchange security policies across the network. In one embodiment, the security policy information is embedded in a notification (e.g., error message) returned from a target server to which a client is seeking access. Based on the additional information embedded in the notification (e.g., error message), the client is able to identify the policy required by the target server.

In FIG. 1, the network system includes a number of devices 110, 150, 172, 174 (device A, device B, device C and device D) coupled to each other via a network 170. The network 170 may be realized, for example, by the Internet, a WAN (wide-area network) and/or a LAN (local-area network). Further, wired and wireless systems can both be applied to the network. Each of the devices 110, 150, 172, 174 may be realized, for example, by a server, a client computer, a multi-function device (e.g., equipped with scanning, printing and/or copying functional units), or any other suitable device capable of requesting and/or processing services over the network. Any suitable communication protocol may be used for establish communication between the devices 110, 150, 172, 174, such as, for example, HTTP (HyperText Transfer Protocol), Web service protocol, SOAP (Simple Object Access Protocol), and TCPIP.

For purposes of illustration, in an example described below, the device A is serving as a client and the device B is serving as a server (e.g., Web server capable of performing Web services). The device A (also referred to herein as "client" 110) includes a number of applications 116, 118 (application A and application B) that communicates with a policy discovery unit 120 and an authentication processing unit 122. Each of the applications 116, 118 executed by the client 110 can receive information regarding a user input and can establish communication with the device B (also referred herein as "Web server" or "server" 150) in response to the user input requesting access to one of the services performed by the server 150. When this occurs, an application (e.g., application 116) executed by the client 110 may initially use a local credential 132 maintained by the client 110 to access the server 150. In the case where the client 110 maintains a library of local credentials, the application 116 will select one of the local credentials 132, 134 for presenting to the server 150 based on, for example, information (e.g., identification or server-type information) associated with the requested server or information (e.g., identification or service-type information) associated with the requested service.

In an embodiment, the application 116 executed by the client 110 employs the policy discovery unit 120 to automatically determine security policy associated with the requested server 150 and employs the authentication processing unit 122 to generate a remote credential 136 that complies with the security policy associated with the requested server. The remote credential 136 can be generated by the authentication processing unit 122 by acquiring information from the client user or using one of the local credentials 132, 134 selected based on the security policy information acquired by the policy discover unit 120.

The security policy information acquired by the policy discovery unit 120 can be associated with a login application (e.g., authentication component) and/or a service provided by a server to which the client 110 is seeking access. In an embodiment, the security policy information acquired by the policy discovery unit 120 may include (1) the type(s) of authentication token accepted by a login application and/or a service provided the target server, (2) the name of the domain to which the target server is associated, (3) a list of trusted domain identification information, and (4) other claim(s) (e.g., custom property of token) associated with the login application. Based on the security policy information acquired by the policy discovery unit 120, the authentication processing unit 122 is configured to allow the client 110 to select and display a proper display screen (e.g., login screen) to acquire a credential that satisfies the policy definition(s) of the login application.

In one embodiment, the authentication processing unit 122 is capable of determining whether single-sign-on (SSO) functionality can be used to access the server 150 based on the security policy information acquired by the policy discovery unit 120. Additionally, the authentication processing unit 122 is capable of determining whether or not interactive-sign-on (ISO) is required. In one embodiment, when the security policy of the login application and/or Web service of the target server 150 does not match with any of the local credentials or local credential authentication types, the authentication processing unit 122 may determine that ISO is required to establish authentication between the client 110 and the Web server 150. If the authentication processing unit 122 determines that ISO is required, the authentication processing unit 122 will generate a pop-up window to prompt the client user to enter the information necessary for generating a proper credential complying with the security policy of the target server 150.

In an embodiment, the policy discovery unit 120 is capable of extracting, from a notification (e.g., error message) returned from the server 150, the security policy information associated with the login application 152 executed by the server 150. Alternatively or in addition to, the policy discovery unit 120 is capable of extracting, from the error message returned from the server 150, the security policy information associated with a service (e.g., Web service) provided by the server 150 to which the client 110 is seeking access. Based on the security policy information extracted by the policy discovery unit 120, the client application 116 in communication with the authentication processing unit 122 can generate and display a pop-up window to obtain the necessary information from the client user required for establishing authentication with the target server 150. Once the client application 116 acquires the necessary information from the user, the authentication processing unit 122 will use the information to generate a new request to authenticate with the server 150. Once the client 110 is granted access to the server 150 (e.g., by obtaining a security token), it can use the security token to securely communicate with the target server 150 as long as that security token is accepted by the server.

It is noted that the policy discovery unit 120 and the authentication processing unit 122 refer to software or a combination of software and hardware. For example, each of the policy discovery unit 120 and the authentication processing unit 122 may be realized, for example, by a process executed on a processor, programmable hardware, a program, and/or a computer. It is further noted that although the policy discovering unit 120 and the authentication processing unit are shown as being separate components from the applications 116, 118, it is noted that the policy discovery unit 120 and the authentication processing unit 122 can be incorporated in each individual application as a single application package.

As shown in FIG. 1, the server 150 includes a number of login applications 152, 162 (login application A, login application B) and a number of Web service applications 164, 166 (Web service A, Web service B). The server 150 can have varying levels of security policies for different login applications 152, 154 executable by the server. Thus, depending on which login application is executed by the server 110, the security policy requirements for accessing the server 110 may vary. There are a number of security policies that can be specified by each of the login applications 152, 162, such as for example, (1) an authentication requirement (e.g., to specify whether a client is required to be authenticated on the Web server prior to executing Web service operation), (2) the type of authentication mechanism used (e.g., NTLM, Kerberos, local), (3) an encryption requirement (e.g., to specify whether encryption is required when using Web service and type of encryption algorithm required), and (4) a signature requirement (e.g., to specify whether signature is required when using Web service and type of signature algorithm required).

Additionally, the server 150 includes a number of Web service applications 164, 166, each of which implements a particular function (Web service) that can be accessed by an external device. It is noted that although the Device B (server 150) is illustrated as a single device in FIG. 1, it is not necessary that the functional units (e.g., login applications and the Web service applications) reside in the same device. Thus, alternatively, for example, the login applications may be executed in a device separate from the device performing the Web service functions.

The server 150 can have varying levels of security policies for different Web service applications 164, 166 executable by the server. Thus, depending on which Web service application function is requested by the client 110, the security policy requirements for accessing the requested Web service may vary.

As shown in FIG. 1, the login application A 152 includes a policy manager 154, an authentication manager 156, an error message generator 158 and a policy table 160. The policy manager 154 is configured to enforce the security policy of the login application 152 and/or one of the Web services 164, 166 to which a client is seeking access.

When the login application A 152 is executed by the server 150, the policy manager 154 is configured to receive an incoming request from an external device (e.g., client 110) and examine it to determine if the request satisfies the security policy requirements of the login application A 152. In this regard, the policy table 160 is referenced by the policy manager 154 to acquire the information associated with security policy defined by the login application A and uses the acquired information to make the determination of whether or not the incoming request satisfies the policy requirements of the login application A 152. In cases where each of the Web services 164, 166 executable by the device B is assigned different levels of security policy, the policy manager 154 is capable of determining if an incoming request satisfies policy requirements of a requested Web service by looking up policy requirement information associated with the requested service stored in the policy table 160. Accordingly, the policy table 160 includes a set of security policies defined for each of the Web services 164, 166 executable by the server 150 as well as security policy defined for the login application 152.

As noted above, if an incoming request from the client 110 does not satisfy the policy applicable for the login application and/or the request Web service, the login application 152 is configured to inform the client 110 of its current security policy setting. This may be accomplished by the error message generator 158 generating a notification (e.g., error message) that contains policy information applicable for the currently executed login application (e.g., login application A 152) and/or the requested service. On the other hand, if the incoming request from the client 110 does satisfy the security policy of the currently executed login application and/or the Web service pertaining to the request, the authentication manager 156 will issue a security token to grant access to the client user.

Figure 2:
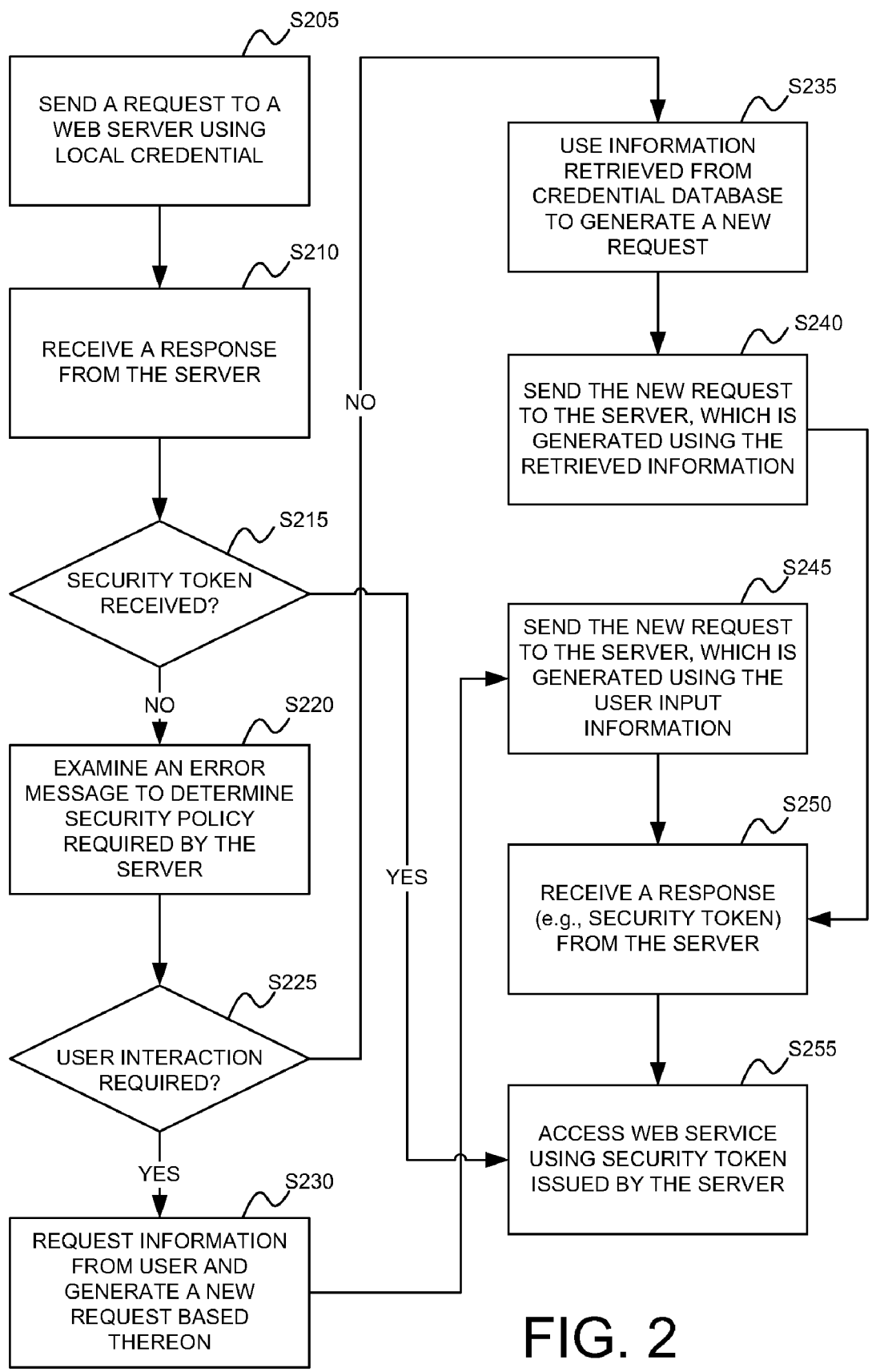
FIG. 2 is a flowchart diagram of operations performed by a client of the network system according to an embodiment of the present invention.

FIG. 2 is a flowchart illustrating operations performed by a client of the network system according to an embodiment of the present invention. In step S205, the client 110 transmits an access request to the server 150 to access a service provided by the server. The request may include identification information of one of the Web services 164, 166 executable by the server 150 to which the client user is seeking access.

Next, in step S210, the client 110 waits to receive a response from the server 150. The response returned by the server 150 may be a security token authenticating the client 110 and granting access to the requested Web service. The security token may be issued based on verification of the content (e.g., credential) of the request. Alternatively, the response returned by the server 150 may be a notification (e.g., error message) indicating that the client 110 is denied access for failing to comply with the security policy defined by the server 150.

Accordingly, in step S215, the client 110 determines whether or not the response returned by the server 150 includes a security token granting access to the requested Web service. If it is determined that the response includes a security token ("Yes" at step S215), the processing proceeds to step S255 where the security token is used by the client 110 to access the requested service during a service session. On the other hand, if it is determined that the response does not include a security token ("No" at step S215), the processing proceeds to step S220 where the policy discovery unit 120 examines the response (e.g., an error message) to determine security policy defined by the server 150. In an embodiment, the error message employs an XML (extensible Markup Language) to explicitly specify security policy defined by the server. In an accordance with an embodiment of the present invention, the response (e.g., error message) returned by the server may include one or more of the following: (1) information identifying a domain to which the server is associated, (2) a list of trusted domain identification information, and (3) information relating to a custom property of a token defined by a login application of the server.

Once the security policy information embedded in the error message has been extracted, the client 110 uses the security policy information to determine whether single-sign-on (SSO) is enabled or whether it needs to prompt the user to obtain information necessary for complying with the security policy of the server. More specifically, the security policy information determined by the policy discovery unit 120 of the client 110 is communicated to the authentication processing unit 122. Then in step S225, based on the examination of the security policy information, the authentication processing unit 122 of the client 110 determines if a user interaction is required to generate a new access request that complies with the security policy defined by the server 150. If it is determined that a user interaction is not required to generate a new access request ("No" in step S225), the processing proceeds to step S235 where the authentication processing unit 122 uses information associated with one of the local credentials 132, 134 retrieved from the database 130 to generate the new access request. For example, the database 130 maintained by the client 110 may include a library of credentials. In step S240, the new access request is sent to the server 150. On the other hand, if it is determined that a user interaction is required to generate a new access request ("Yes" in step S225), the processing proceeds to step S230 where the authentication processing unit 122 generates a pop-up window requesting the client user to input information necessary for generating the new access request. According to an embodiment, the information (e.g. (1) information identifying a domain to which the server is associated, (2) a list of trusted domain identification information, and/or (3) information relating to a custom property of a token defined by a login application of the server) included in the response (e.g., error message) returned from the server enables the client to select and display a proper login screen to acquire the credential that satisfies the policy definition(s) of the login application of the server. When the client 110 has acquired the necessary information through prompting the user, the client can then proceeds to the authentication operation by generating a new access request. Next, in step S245, the new access request is sent to the server.

In an embodiment, the client 110 uses Web Services Trust Language (WS-Trust) protocol to authenticate with the server 150. However, it is noted that any suitable authentication technique may be employed to authenticate the client 100 with the server 150, including using a standard token (e.g., Kerberos) or a custom token (e.g., SDL, NTLM, CPCA).

In response to the new access request sent by the client 110, the server 150 may return a security token that can be used by the client to access the requested service performed by the server. Accordingly, once the new access request has been sent to the server 150, the client 110 waits to receive a response back from the server in step S250. If the new access request sent by the client complies with the security policy specified in the error message, the server will authenticate the client and return a security token. The security token issued by the server can be used in steps S255 to access the requested Web service.

Figure 3:
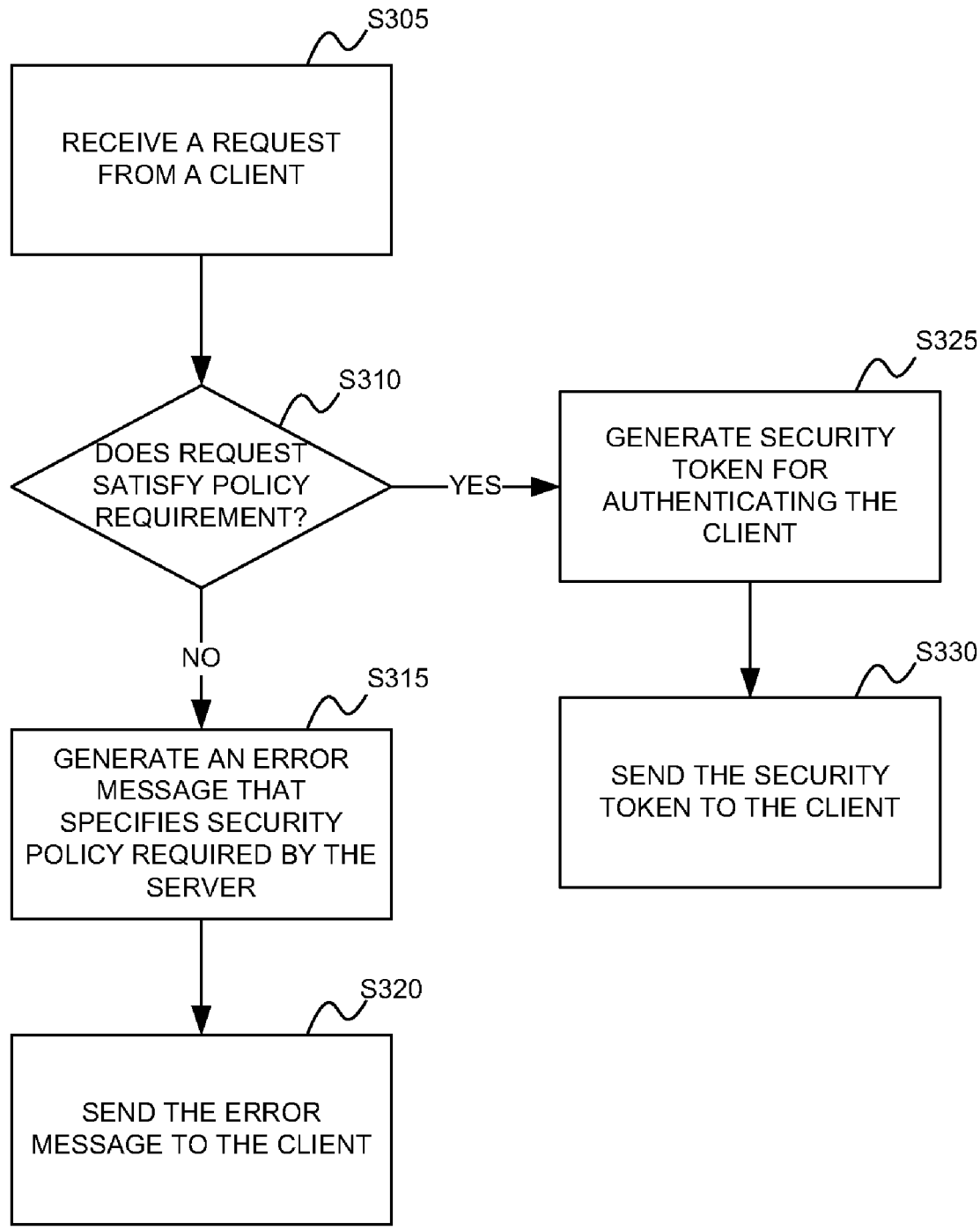
FIG. 3 is a flowchart diagram of operations performed by a server of the network system according to an embodiment of the present invention.

FIG. 3 is a flowchart illustrating operations performed by a server of the network system according to an embodiment of the present invention. In step S305, the server 150 receives an access request from the client 110. In an embodiment, the server is configured to authenticate the client based on verification of credential information attached to the request.

Accordingly, in step S310, the login application currently executed by the server 150 determines if the credential information attached to the request satisfies security policy requirements of the server. If the request fails to satisfy the security policy requirements ("No" at step S310), the processing proceeds to step S315. In step S315, the server 150 denies access to the client 110 and generates a notification (e.g., error message) informing that the request has been denied. Additionally, the notification (e.g., error message) includes information specifying security policy defined by the server 150 in accordance with an aspect of the present invention. As noted above, the notification generated by the server may include one or more of the following: (1) information identifying a domain to which the server is associated, (2) a list of trusted domain identification information, and (3) information relating to a custom property of a token defined by the login application of the server. Then, in step S320, the notification (e.g., error message) is sent to the client 110.

On the other hand, if the request does satisfy the security policy requirements ("Yes" at step S310), the processing proceeds to step S325. In step S325, the server 150 authenticates the client 110 and grants access by generating a security token. Next, in step S330, the security token is sent to the client 110.

Figure 4:
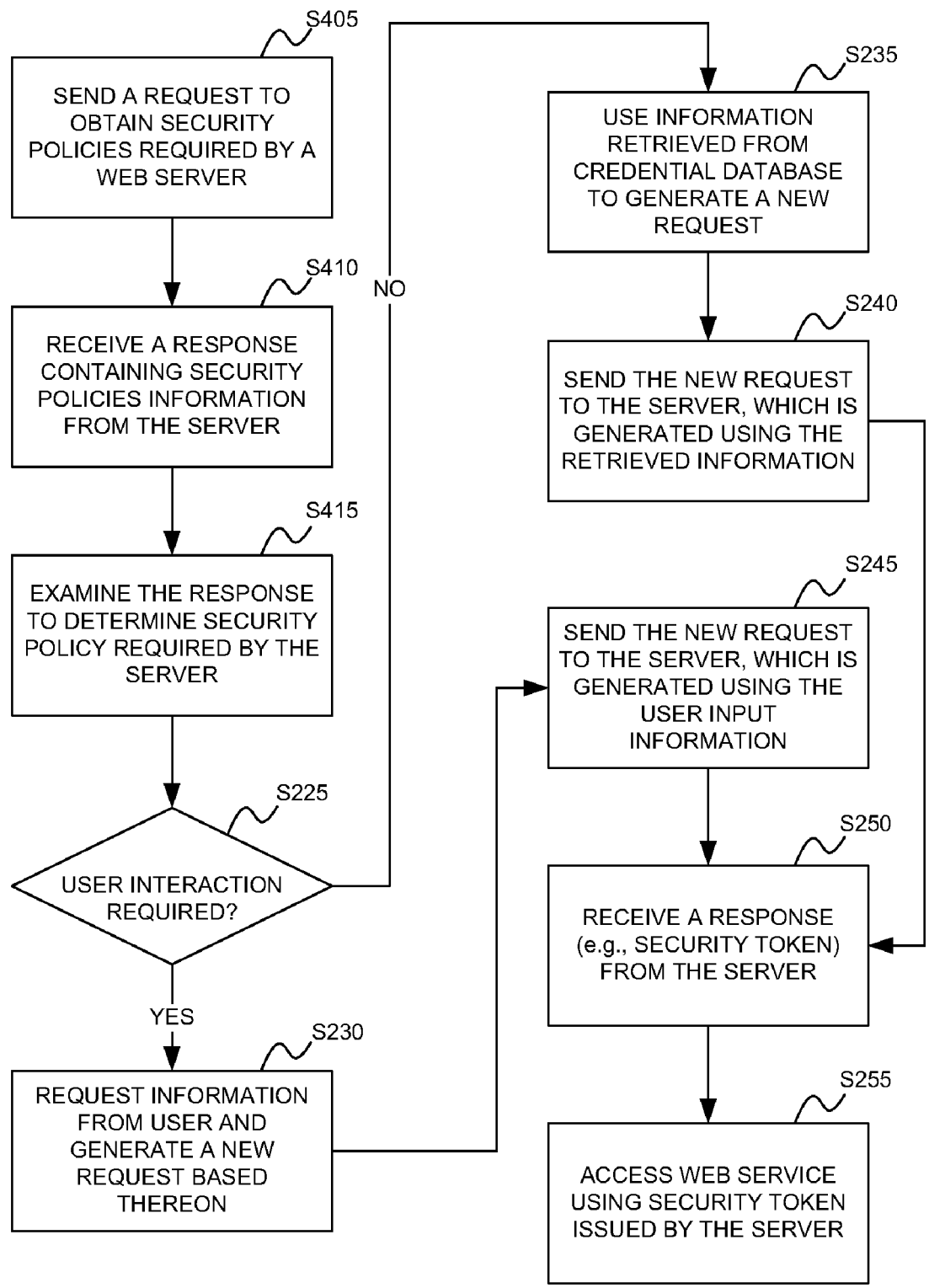
FIG. 4 is a flowchart diagram of operations performed by a client of the network system according to another embodiment of the present invention.

FIG. 4 is a flowchart illustrating operations performed by the client of the network system according to another embodiment of the present invention. It is noted that steps S225 through S255 illustrated in FIG. 4 are generally the same or similar as steps S225 through S255 illustrated and described with respect to FIG. 2. Accordingly, descriptions with respect to those steps S225 through S255 will be omitted.

In order for the client 110 to authenticate with the server 150, the client is configured to determine security policy information associated with a login application and/or a service executable by the server. In the embodiment illustrated in FIG. 4, security policy information of the server 150 is determined by generating and sending a request to obtain such information.

Accordingly, in step S405, the client generates and sends a request to the server to obtain security policy information. In response to the request, the server will generate and forward a response containing the requested information, such as, security requirements of a service (e.g., authentication, encryption, signature), and security requirements of the login application (e.g., types of authentication tokens accepted by login application and the claims associated with the authentication token).

In step S410, the client 110 receives the response returned by the server 150, which includes security policy information associated with the server. Next, in step S415, the policy discovery unit 120 of the client 110 examines the response to determine security policy defined by the Web server. Once security policy information has been determined, the authentication processing unit 122 of the client 110 uses the policy information to determine whether single-sign-on (SSO) is enabled or whether it needs to prompt the user for information needed to comply with the policy requirement.

Figure 5:
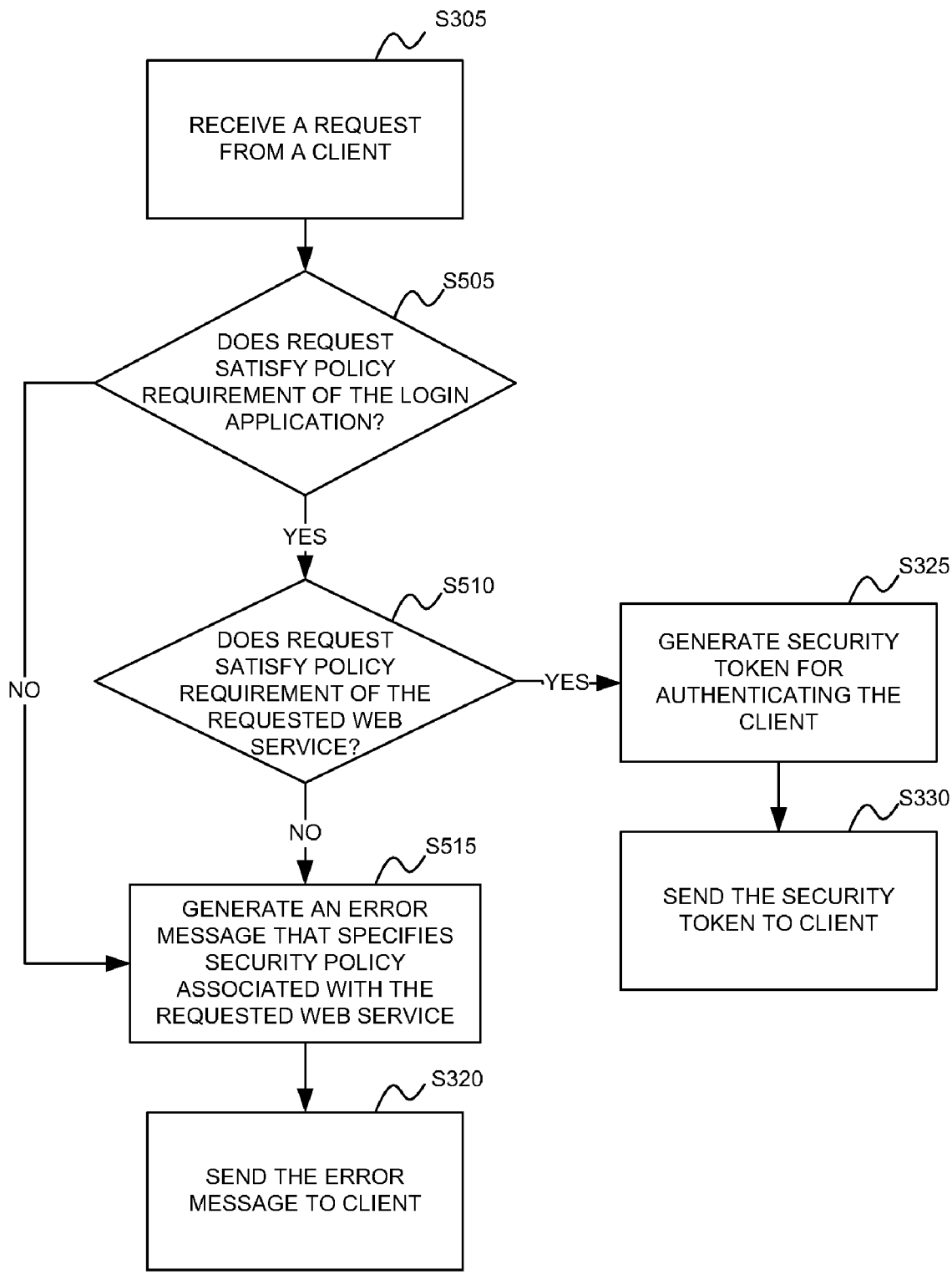
FIG. 5 is a flowchart diagram of operations performed by a server of the network system according to another embodiment of the present invention.

FIG. 5 is a flowchart illustrating operations performed by the server of the network system according to another embodiment of the present invention. It is noted that steps S320 through S330 illustrated in FIG. 5 are generally the same or similar as steps S320 through S330 illustrated and described with respect to FIG. 3. Accordingly, descriptions with respect to those steps S320 through S330 will be omitted.

In step S305, the server 150 receives a request (e.g., access request) transmitted by a client 110. Next, the server 150 communicates the received request to the login application currently executed thereby. As noted above, the server 150 may be capable of executing any one of a number of login applications and each of the login applications can have different security policy requirements associated therewith. Thus, depending on which login application is executed by the server, the security policy requirements for accessing the server may vary.

Accordingly, in step S505, the server 150 determines if the request satisfies the security policy associated with the login application currently executed by the server. If the request fails to satisfy the security policy defined by the login application ("No" at step S505), the processing proceeds to step S515 in which an error message is generated, which explicitly specifies the security policy information defined by the login application. Otherwise, if the request does satisfy the security policy defined by the login application ("Yes" in step S505), the processing proceeds to step S510.

In an embodiment, the request issued by the client 110 includes information identifying one of the services to which the client is seeking access. And, as noted above, each of the services can have different security policy requirements associated with them. Accordingly, in step S510, the login application determines if the request from the client satisfies the policy requirement of the service to which the client is seeking access. This is accomplished by the policy manager 154 looking up security policy information associated with the requested Web service stored in the policy table 160. The policy table 160 maintained by the login application 152 includes a set of security policies defined for each of the Web services 164, 166 executable by the server 150.

If the access request does satisfy the security policy requirement of the requested Web service ("Yes" in step S510), the processing proceeds to step S325 in which a security token for authenticating the client is generated.

On the other hand, if the access request does not satisfy the security policy requirements of the requested Web services ("No" in step S510), the processing proceeds to step S515 in which an error message is generated, which explicitly specifies security policy information regarding the Web service to which the client is seeking access.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method comprising:
transmitting a first request to access a service provided by a server;
receiving a response to the first request from the server;
determining whether or not the response includes a security token;
accessing the service by using the security token in a case where the response is determined to include the security token;
examining a notification in the response generated in response to the first request being denied access and determining policy associated with the server, in a case where the response is determined not to include the security token;
determining whether user input is required to access the server, based on examination of the notification;
in a case where it is determined that the user input is not required to access the server, generating a credential that is in compliance with the policy associated with the server from a library of credentials, based on examination of the notification;
in a case where it is determined that user input is required to access the server, displaying a screen to prompt the user to input information for generating the credential that is in compliance with the policy associated with the server;
generating a second request using the credential in accordance with the policy associated with the server; and
transmitting the second request to access the service provided by the server.

2. The method of claim 1, wherein the notification from the server includes information identifying a domain to which the server is associated.

3. The method of claim 1, wherein the notification from the server includes a list of trusted domain identification information.

4. The method of claim 1, wherein the notification from the server includes information relating to a custom property of a token defined by a login application of the server.

5. The method of claim 1, wherein the notification from the server is an error message that has policy information embedded therein, and wherein the error message is generated by the server in response to a determination that the first request does not comply with the policy associated with the server.

6. The method of claim 5, wherein the embedded policy information includes security policy associated with a login application currently executed by the server.

7. The method of claim 5, wherein the embedded policy information includes security policy associated with the service to which the first request is seeking access.

8. A system comprising:
a server configured to perform a service, the server configured to generate a response having a notification with a policy associated with the server embedded therein if an incoming first request to access the service is denied; and
a client coupled to the server via a network, the client configured to:
generate and send the first request to access the service provided by the server;
receive the response to the first request from the server;
determine whether or not the response includes a security token;
access the service by using the security token in a case where the response is determined to include the security token;
examine the notification in the response generated in response to the first request being denied access and determine policy associated with the server, in a case where the response is determined not to include the security token;
determine whether user input is required to access the server, based on examination of the notification;
generate a second request using a credential in accordance with the policy associated with the server; and
transmit the second request to access the service provided by the server,
wherein, in a case where it is determined that user input is not required to access the server, the client is configured to generate the credential that is in compliance with the policy associated with the server from a library of credentials, based on examination of the notification, and
wherein, in a case where it is determined that user input is required to access the server, the client is configured to display a screen to prompt the user to input information for generating the credential that is in compliance with the policy associated with the server.

9. The system of claim 8, wherein the notification from the server includes information identifying a domain to which the server is associated.

10. The system of claim 8, wherein the notification from the server includes a list of trusted domain identification information.

11. The system of claim 8, wherein the server is capable of performing a plurality of services, and
wherein the request sent by the client is an access request including identification information of one of the services provided by the server to which the client is seeking access.

12. The system of claim 8, wherein the server comprises:
a login application to receive an incoming request from the client and to determine if credential information included in the request satisfies policy requirement of the login application, the login application capable of generating a notification that includes the policy requirement of the login application if the incoming request fails to satisfy the policy requirement.

13. The system of claim 12, wherein the notification generated by the login application is an error message that has policy information embedded therein.

14. The system of claim 8, wherein the client comprises:
a policy discovery unit to determine security policy associated with the server based on the policy information embedded in the error message; and
an authentication request unit to generate another request for authentication with the server based on the security policy determined by the policy discovery unit.

15. An apparatus comprising:
a communication interface to establish communication with a server connected to a network;

an application configured to receive a user input and to generate a first request to access a service provided by the server in response to the user input requesting access to the service;

a receiving unit configured to receive a response to the first request from the server;

a determining unit configured to determine whether or not the response includes a security token;

a security token access unit configured to access the service by using the security token in a case where the response is determined to include the security token;

a policy discovery unit configured to examine a notification in the response generated in response to the first request being denied access and to determine policy associated with the server, in a case where the response is determined not to include the security token;

an authentication processing unit configured to determine whether user input is required to access the server, based on examination of the notification, and to generate a credential that is in compliance with the policy associated with the server, based on examination of the notification, and to generate a second request using the credential in accordance with the policy associated with the server; and a transmitting unit configured to transmit the second request to access the service provided by the server, wherein, in a case where it is determined that user input is not required to access the server, the authentication processing unit generates the credential that is in compliance with the policy associated with the server from a library of credentials, and wherein, in a case where it is determined that user input is required to access the server, the authentication processing unit displays a screen to prompt the user to input information for generating the credential that is in compliance with the policy associated with the server.

16. The apparatus of claim 15, wherein the notification from the server includes information identifying a domain to which the server is associated.

17. The apparatus of claim 15, wherein the notification received from the server is an error message that has policy information embedded therein, and wherein the policy discovery unit is capable of determining the security policy associated with the server based on the policy information embedded in the error message.

18. The apparatus of claim 15, further comprising:

an application in communication with the policy discover unit and the authentication processing unit is capable of receiving a user input and generating an access request in response to the user input requesting access to a service performed by the server.

19. The apparatus of claim 18, further comprising:

a plurality of credentials, wherein the authentication processing unit is configured to select one of the credentials based on the determined security policy and to generate the access request using the selected credential.

* * * * *